US011729489B2

(12) United States Patent
Burger

(10) Patent No.: US 11,729,489 B2
(45) Date of Patent: Aug. 15, 2023

(54) VIDEO CHAT WITH PLURAL USERS USING SAME CAMERA

(71) Applicant: ARRIS Enterprises LLC, Suwanee, GA (US)

(72) Inventor: Carl A. Burger, Hatboro, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/468,743

(22) Filed: Sep. 8, 2021

(65) Prior Publication Data

US 2022/0166918 A1 May 26, 2022

Related U.S. Application Data

(60) Provisional application No. 63/118,298, filed on Nov. 25, 2020.

(51) Int. Cl.
*H04N 5/232* (2006.01)
*G10L 15/25* (2013.01)
*H04N 21/431* (2011.01)
*H04N 23/611* (2023.01)
*H04N 23/69* (2023.01)
*H04N 23/695* (2023.01)

(52) U.S. Cl.
CPC ........... *H04N 23/611* (2023.01); *G10L 15/25* (2013.01); *H04N 21/4314* (2013.01); *H04N 23/69* (2023.01); *H04N 23/695* (2023.01)

(58) Field of Classification Search
None
See application file for complete search history.

(56) References Cited

U.S. PATENT DOCUMENTS

| 2012/0026277 | A1 | 2/2012 | Malzbender et al. |
| 2012/0062732 | A1* | 3/2012 | Marman .......... G08B 13/19682 |
| | | | 348/142 |
| 2015/0310260 | A1 | 10/2015 | Summers |
| 2019/0035242 | A1* | 1/2019 | Vazirani ................. G08B 7/066 |
| 2019/0089910 | A1 | 3/2019 | Banik et al. |
| 2019/0215464 | A1* | 7/2019 | Kumar ..................... H04N 7/08 |

FOREIGN PATENT DOCUMENTS

KR  10-2011-0050150 A   5/2011

OTHER PUBLICATIONS

Notification of Transmittal of the International Search Report (Forms PCT/ISA/220 and PCT/ISA/210) and the Written Opinion of the International Searching Authority (Form PCT/ISA/237) dated Dec. 21, 2021, by the International Application Division Korean Intellectual Property Office in corresponding International Application No. PCT/US2021/049331. (9 pages).

* cited by examiner

*Primary Examiner* — Edemio Navas, Jr.
(74) *Attorney, Agent, or Firm* — Panitch Schwarze Belisario & Nadel LLC

(57) ABSTRACT

Illustrative embodiments are directed to a device and method for improving a video chat experience. The device provides a video chat session between users. The device receives a first video stream of multiple users captured by a camera at the same time. The device identifies objects representing the users in the first video stream, respectively. The device generates a modified stream by altering image data to remove a portion of depicted visual content between the objects. The device receives a second video stream. The device outputs, to user devices, the modified first video stream and the second video stream for display to the users.

18 Claims, 13 Drawing Sheets

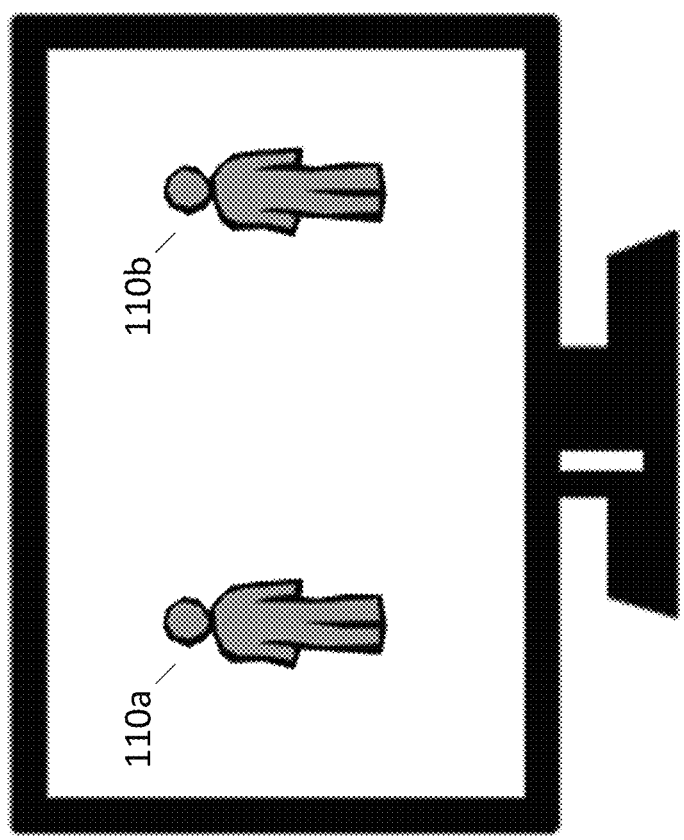

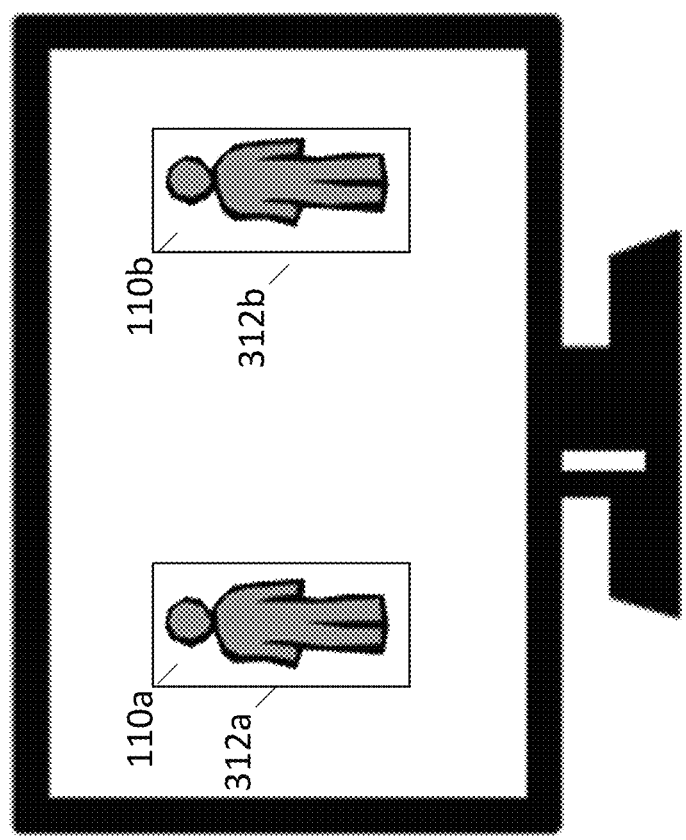

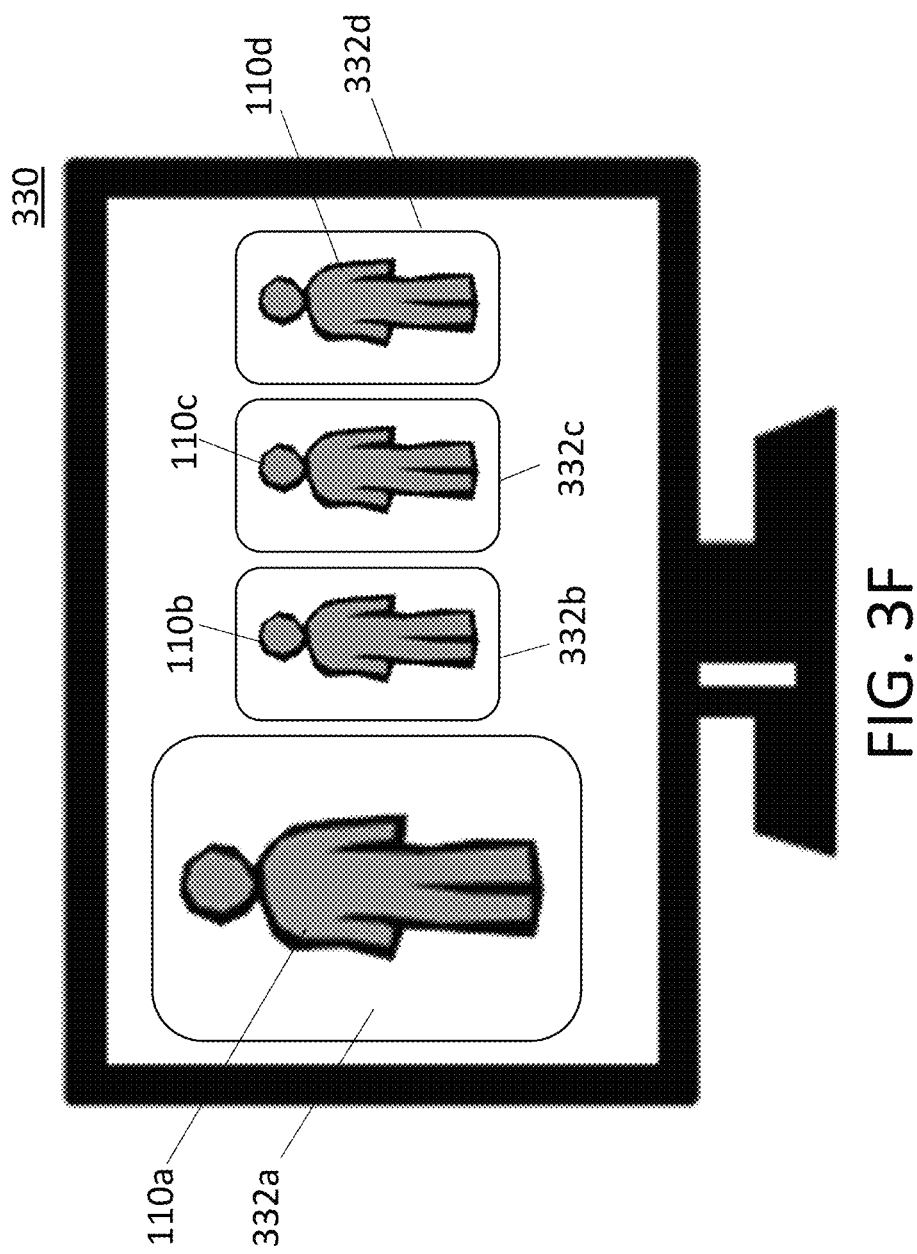

US 11,729,489 B2

VIDEO CHAT WITH PLURAL USERS USING SAME CAMERA

FIELD

The present disclosure is related to improving a video chat experience, and particularly when multiple users are using the same camera.

BACKGROUND

With the advent of the COVID-19 pandemic, video chat services have gained tremendous popularity as a means for people to stay connected with family, friends, and co-workers. Current video stream services permit users of different devices to have a video chat with one another. However, users of video chat services are currently confined to smartphones, tablets, and computers. Further, if multiple users are in the same room or area and wish to use the same camera to provide their video stream in the video chat, then those users will look too small and hard to see in the video chat thereby providing a suboptimal video chat experience. Exacerbating the problem, the size of those users will be even smaller with the addition of more people wishing to use the same camera to provide their video stream in the video chat and/or if the users wish to remain spaced apart (e.g., 6 feet) from one another to maintain social distancing between them. This is because the camera would be forced to zoom out in order to fit all of the users in the same frame thereby causing each user in the frame to appear smaller.

As such, it is desirable to provide a method and system for improving the video chat experience when multiple users are using the same camera.

SUMMARY

An illustrative method for improving the video chat experience is disclosed. The method includes providing, by a computing device, a video chat session between a first user and a second user associated with a first user device and a third user associated with a second user device; receiving, by a computing device and from the first user device, a first video stream of at least the first user and the second user captured by a camera associated with the first user device, wherein the camera associated with the first user device captures image data of both the first user and the second user at the same time; identifying, by the computing device and in the first video stream, a first object representing the first user and a second object representing the second user; generating, by the computing device, a modified first video stream by altering image data to remove a portion of depicted content between the first object representing the first user and the second object representing the second user such that the first object is depicted adjacent to the second object; receiving, by the computing device and from the second user device, a second video stream of the third user captured by a camera associated with the second user device; and outputting, by the computing device and to the first and second user devices, the modified first video stream and the second video stream such that the modified first video stream is displayed in a first video tile while the second video stream is displayed in a second video tile.

An illustrative device for improving the video chat experience. The device includes a network interface configured to interface with a first user device and a second user device; a processor; and a memory configured to store instructions that, when executed by the processor, cause the computing device to: provide a video chat session between a first user and a second user associated with the first user device and a third user associated with the second user device; receive, from the first user device, a first video stream of at least the first user and the second user captured by a camera associated with the first user device, wherein the camera associated with the first user device captures image data of both the first user and the second user at the same time; identify, in the first video stream, a first object representing the first user and a second object representing the second user; generate a modified first video stream by altering image data to remove a portion of depicted content between the first object representing the first user and the second object representing the second user such that the first object is depicted adjacent to the second object; receive, from the second user device, a second video stream of the third user captured by a camera associated with the second user device; and output, to the first and second user devices, the modified first video stream and the second video stream such that the modified first video stream is displayed in a first video tile while the second video stream is displayed in a second video tile.

BRIEF DESCRIPTION OF THE DRAWINGS

FIGS. 3A-3G depict various user interfaces for improving the video chat experience in accordance with illustrative embodiments of the present disclosure.

DETAILED DESCRIPTION

Illustrative embodiments of the present disclosure provide a manner of improving video chats using computer premise equipment such as a multimedia device of a set-top box and a television connected to the set-top box. The set-top box can receive a request to provide a video chat with users of other devices. Moreover, the set-top box can receive data from video chat processing servers to aid in providing the video chat. The set-top box is configured to control a camera communicatively connected to the set-top box to capture video of multiple users in the vicinity of the set-top box, one or more microphones communicatively connected to the set-top box to capture audio of the users in the vicinity of the set-top box, and a television to display the video chat session. Use of the television in the video chat session allows a larger screen to view other participants in the video chat session, which allows video streams associated with each participant to be displayed in a larger size than that of other computing devices (e.g., smartphones, tablets, computers). As a result, the users in the video chat are more easily seen resulting in a better user experience. To this end, if the users use sign language, the sign language would be more easily seen. Further, with the additional screen display area, additional information could be displayed including, for example, text of the speech of the video chat participants, which may be provided by a speech-to-text program executed by the set-top box or a remote server connected thereto.

Figure 1:
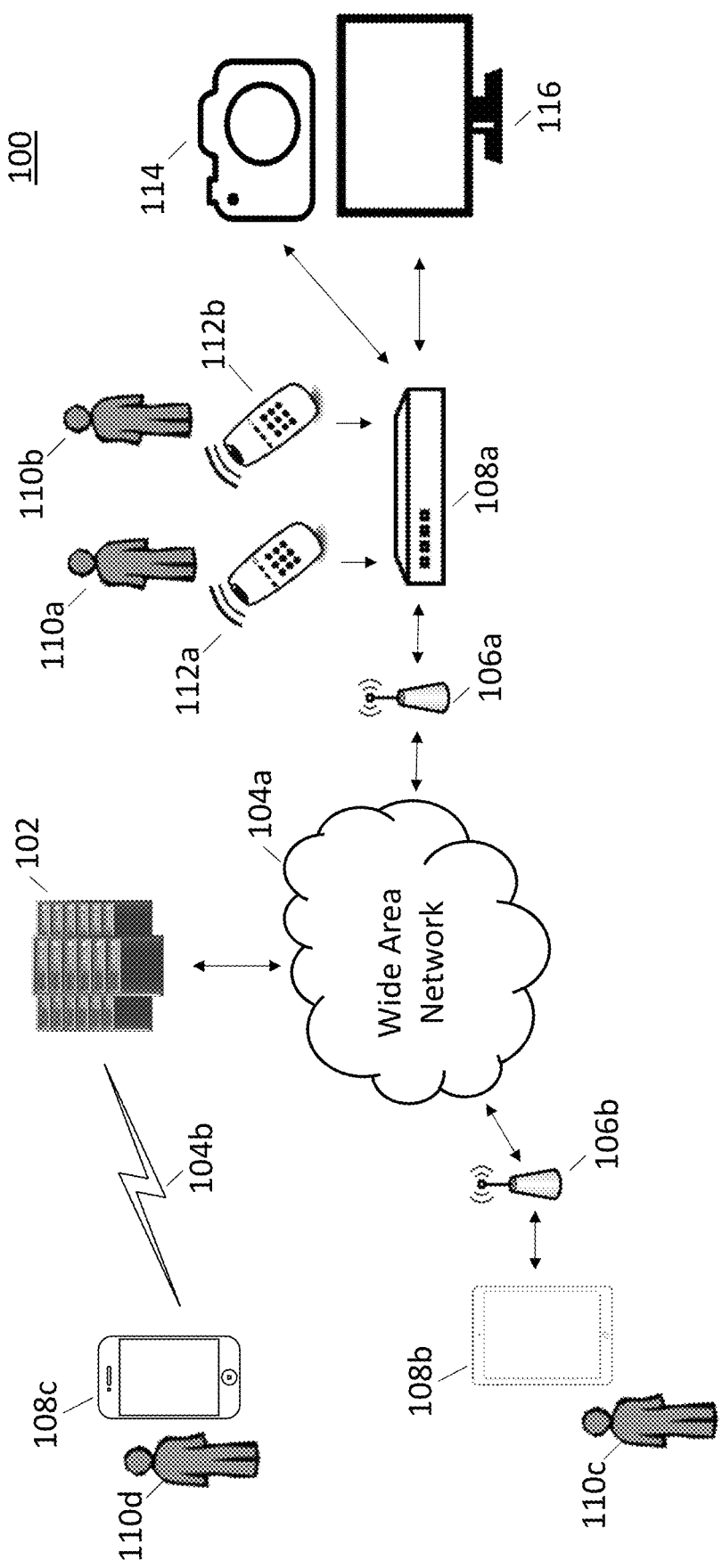
FIG. 1 depicts a block diagram illustrating an example network environment operable to facilitate the improvement of the video chat experience in accordance with illustrative embodiments of the present disclosure.

FIG. 1 depicts a block diagram illustrating an example network environment operable to facilitate the improvement of the video chat experience in accordance with illustrative embodiments of the present disclosure. The network environment 100 may include a video chat management server 102, one or more wide area networks (WANs) 104, one or more access points 106 (e.g., modem, router, etc.), one or more local networks (not shown), multiple client devices 108, one or more remote control units 112 (i.e., a user input device), cameras 114, and at least one television 116.

The video chat management server 102 may be responsible for establishing and managing a video chat session between users 110 of different client devices 108. A video chat session may be a video-based communication session between the users 110 where the users 110 can view each other in real time. The video chat management server 102 may establish communication session between the client devices 108 of the users 110 to relay video streams and audio streams (e.g., signals) between the client devices 108 for output to the users 110. The video chat management server 102 may include features discussed herein to improve the video chat experience of the users 110.

The video chat management server 102 may communicate with the client devices 108 through one or more wired and/or wireless networks. These networks may include one or more WANs 104, which may include a hybrid-fiber coaxial (HFC) network, a fiber network, a coaxial network, a cellular network, a satellite network, and the like. These WANs 104 may interface either with the client device directly (such as when the client device is a smartphone via a cellular network) or through another device such as an access point 106 (e.g., modem, router, and the like). Routers may create separate local networks (e.g., Wi-Fi network, multimedia over coax alliance (MoCA) network, etc.) for communication between the router and the client device 108. The router may then relay via the modem and/or wide area network communications with the video chat management server 102.

Client devices 108 (e.g., user devices) may include set-top boxes, smartphones, tablets, computers, gaming consoles, and any other device operable to receive video, voice, and/or data services. Client devices 108 may be responsible for aiding the video chat management server 102 in the management of the video chat session. Specifically, the client devices 108 may receive and execute instructions from the video chat management server 102 to implement features discussed herein. For instance, the client devices 108 may provide video chat session preference options, receive user preference selections, and transmit the user preferences selections to the video chat management server 102. The client devices 108 may also instruct cameras, which may be either a standalone device (e.g., camera 114) or integrated into the client device itself (e.g., a front facing camera of a smartphone, tablet, or computer), to capture a video stream and provide it to the client device. The client devices 108 may then provide that the video streams to the video chat management server 102 to be relayed to the other client devices 108 participating in the video chat session. The client devices 108 may display the video streams of the video chat session via a display. The display may be a standalone display (e.g., a monitor, a television 116, etc.) or the display may be integrated into the client device itself (e.g., a screen of smartphone or tablet).

Similarly, the client devices 108 may instruct microphones, which may be either a standalone device (e.g., a microphone, a microphone integrated into a remote control unit 112, etc.) or integrated into the client device itself (e.g., a microphone of a smartphone, tablet, or computer), to capture an audio stream and provide it to the client device. The client devices 108 may then provide that the audio streams to the video chat management server 102 to be relayed to the other client devices 108 participating in the video chat session. The client devices 108 may output the audio streams of the video chat session via one or more speakers. The display may be a standalone speaker (e.g., a stereo system connected to the client device, a speaker of the television 116, etc.) or the speaker may be integrated into the client device itself (e.g., a speaker of smartphone or tablet).

The remote control unit (RCU) 112 is a user input device which allows a user to make requests for content. For example, a user may initiate a request for content by activating one or a combination of buttons or keys of the remote control unit (RCU) 112. The RCU 112 may generate a wireless signal via any suitable wireless protocol such as Bluetooth, infrared, radio frequency (RF), or any other type of signal as desired. It should be understood that RCU 112 may also generate and send other types of requests/commands to set-top box 108a. The RCU 112 may include a microphone by which to record the user's voice during a video chat session and transmit the audio data to the set-top box 112. In some examples, the RCU may be a smartphone or tablet.

The video chat session may enable users to communicate with one another via video when at least one of the users is located at a different premises/location (e.g., households, offices, and the like) than at least one other user. In one example, users 110a and 110b may be located at a first premises/location (e.g., a home). To this end, the access point 106a, client device 108a (e.g., set-top box) of users 110a and 110b, RCUs 112, camera 114, and television 116 may all be located at the first premises/location (e.g., the home). In this example, user 110c may be located at a second premises/location (e.g., an office) different from the first premise/location. To this end, the access point 106b and client device 108b (e.g., tablet) of user 110c may both be located at the second premises/location (e.g., the office). In this example, user 110d may be located at third premises/location (e.g., a dog park). To this end, client device 108c (e.g., smartphone) of user 110d may be located at the third premises/location (e.g., the dog park).

Users 110a and 110b may wish to participate in a video chat session with users 110c and 110d by using the television 116 to view the video chat session. By using the television (rather than a smartphone, tablet, or computer), users 110a and 110b will enjoy a much larger viewing area since the size of the television screen is much larger than that of a smartphone, tablet, or computer. As a result, each of the users 110 in the video chat session will be larger than if the video chat session were provided to users 110a and 110b using a smartphone, tablet, or computer. This results in a better viewing experience for users 110a and 110b.

Users 110a and 110b may wish to participate in a video chat session with users 110c and 110d by using a stereo system to hear the video chat session. By using the stereo system connected with the television 116 and/or the set-top box 108a, users 110a and 110b will enjoy a better listening experience as the quality and size of speakers of the stereo system are better than those found in smartphones, tablets, and computers. This results in a better listening experience for users 110a and 110b.

Users 110a and 110b may wish to participate in a video chat session with users 110c and 110d by using a camera 114 situated near the television to record both of them at the same time for the video chat session. In order to fit both users 110a and 110b in the same frame for the video stream, the camera 114 has to zoom out, which causes users 110a and 110b to appear smaller in the video stream than if only one user was being recorded by the camera 114 since the camera 114 would be able to zoom in such that only one user is in the frame. If there are additional users (now shown) that wish to participate in the video chat session using camera 114, then camera 114 would need to zoom out even farther resulting in each of those users appearing even smaller in the video stream. Further, if the users wished to maintain social distancing (e.g., a minimum 6 feet distance between each other), then camera 114 would need to zoom out even farther to capture all of them in the same frame, which results in those users appearing even smaller in the video stream.

The video chat management server 102 may, with the aid of the set-top box 108a, perform image/video processing to enlarge each of the users 110a and 110b and any additional users (not shown) being video captured by camera 114 at the same time. For instance, the video processing may remove any space between users and enlarge each of the users. As a result, the users in the video captured by the camera 114 will appear at least the same size as if the camera 114 had only captured a single user.

Figure 2A:
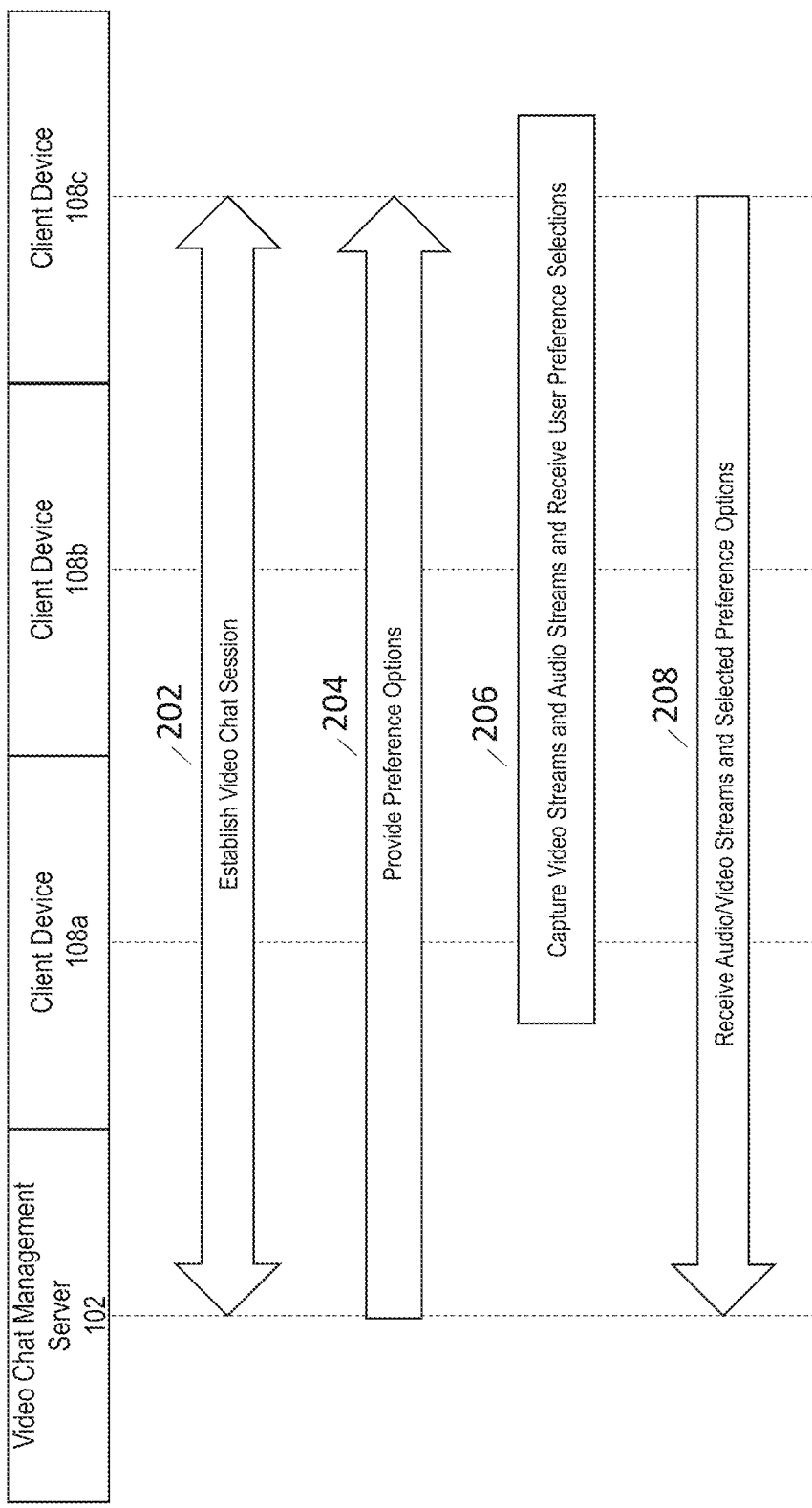
FIGS. 2A-2B depict an illustrative flow diagram for improving the video chat experience in accordance with illustrative embodiments of the present disclosure.
Figure 2B:
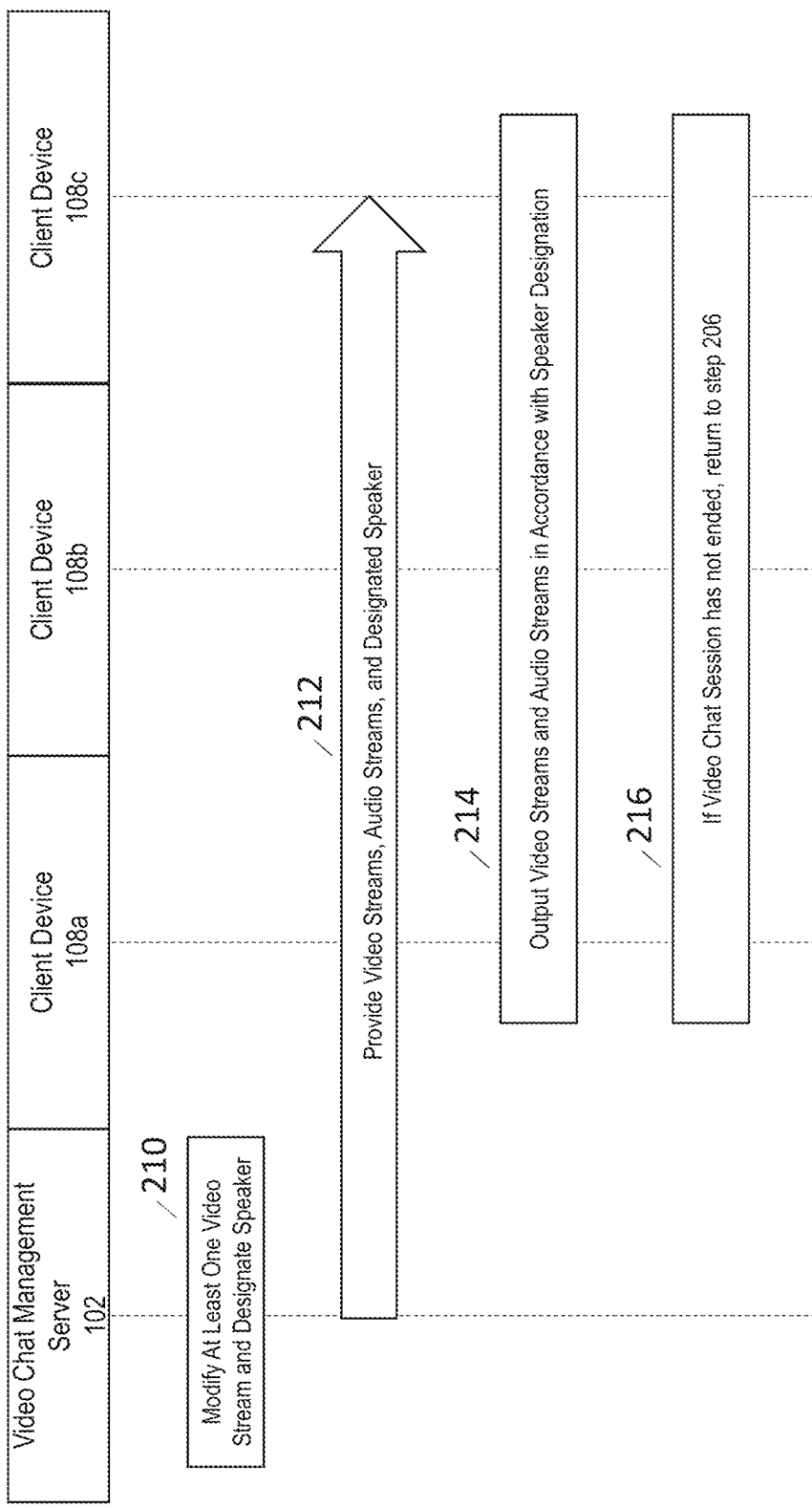

FIGS. 2A-2B depict an illustrative flow diagram for improving the video chat experience in accordance with illustrative embodiments of the present disclosure. Prior to beginning the steps of FIGS. 2A-2B, the video chat management server 102 may provide instructions (e.g., a video chat agent program) to be installed on each of the client device 108, which enables the client devices 108 to perform one or more functions discussed herein.

At step 202, the video chat management server 102 may establish a video chat session. For instance, a client device (e.g., client device 108a) may receive a request from one or more users (e.g., users 110a and 110b) to begin a video chat call with other users (e.g., users 110c and 110d). The request may indicate that the user 110b will use the same client device 108a as user 110a. The request may also include identification information for the various users (e.g., name) and/or their corresponding computing devices (e.g., media access control (MAC) address, internet protocol (IP) address, phone number, and the like). The identification information may be retrieved from an electronic contact or address book specific to the requesting user, which may be stored by the video chat management server 102 and/or the requesting client device (e.g., client device 108a). The video chat management server 102 may send the request to the other users/client devices based on the identification information and, in response, may receive an acceptance or denial for the video chat session from the other users/client devices. If all the users of other client devices deny the request, then the video chat management server 102 would deny the video chat session and notify the requesting client device.

If at least one of the users of another client device accepts, the video chat management server 102 proceeds to establish secure communication session between the requesting client device and each of the accepting client devices. Any client devices that sent a denial would not be included in the secure communication session and the video chat management server 102 would send the requesting user/client device a notification of the denial.

In the example shown in FIGS. 2A-2B, each of the client devices 108b and 108c have accepted the video chat session initiated by client device 108a. The video chat management server 102 may perform a public key infrastructure (PKI) handshake with each of the client devices 108 to establish a secure tunnel. In some instance, the video chat management server 102 may encrypt outbound communications (e.g., video streams, audio streams, speaker designation, etc.) with a public key of the receiving client device 108, which the client devices 108 may decrypt using its private key. Similarly, the client devices 108 may encrypt outbound communications using the public key of the video chat management server 102 and the video chat management server 102 (and/or other computing devices) may decrypt such communications using its private key.

At step 204, the video chat management server 102 may provide preference options to each client device participating in the video chat session (e.g., client devices 108a, 108b, and 108c). The preference options may include zoom preference options, crop preference options, object selection options, and the like. In some instances, rather than send the preference options after the establishment of the video chat session, the preference options may be included in each of the agents installed on the client devices 108.

At step 206, each of the client devices 108 capture video stream and audio streams as well as receive user preference selections. Particularly, the client devices 108 may instruct their integrated microphone or microphone connected thereto to begin capturing audio, which causes the microphone to begin capturing audio. The client devices 108 may instruct their integrated camera or camera connected thereto to begin capturing video, which causes the cameras to begin capturing video. As an example, client device 108a may instruct camera 114 to begin capturing video of users 110a and 110b. Client device 108b may instruct its integrated camera to begin capturing video of user 110c. Similarly, client device 108c may instruct its integrated camera to being capturing video of user 110d. The captured video may be in form of a real-time video stream.

The client devices 108 may receive their respective video streams from the cameras and may, in turn, output the respective video streams on a display device either integrated or connected to the respective client device 108. As an example, client device 108a may receive a video stream from camera 114 and output the video stream to television 116 for display to users 110a and 110b. Client device 108b may obtain a video stream from its integrated camera and display it on its integrated display. Similarly, client device 108c may obtain a video stream from its integrated camera and display it on its integrated display.

The client devices 108 may, via the agent, display a tool box with the preference options. The client devices 108 may display the preference options alongside the video stream in the same display screen. The preference options may include zoom preference options, crop preference options, object selection options, and the like. Using these options, the users can select a zoom option to size each user (e.g., zoom in, zoom out for each user), any portions of the video stream that should be cropped (e.g., removed, deleted), and object selection. As an example, client device 108a may display users 110a and 110b as shown in display screen 305 of FIG. 3A. Users 110a and 110b may use RCUs 112a and 112b to enter their preferences. As shown in FIG. 3B, users may select, size, and orient bounded boxes 312a and 312b (i.e., an indication marking a perimeter of an object) to identify themselves as shown in display screen 310. These bounded boxes may be referred to herein as objects. The television 116 and/or client devices 108b and 108c may display the preference selections (e.g., object selection (location of bounded boxes in frame such as x-y pixel locations), size preference, and crop preference). Client devices 108 may receive the user preference selections via man-machine interfaces (e.g., remote control, touch screen, mouse, keyboard, monitor, etc.). While the bounded boxes and other preferences may be temporarily visible to the users when setting their preferences, they are no longer visible after a predetermined time period has elapsed since being set by the user.

At step 208, the video chat management server 102 may receive, from each client device 108, the video stream, the audio stream, and the user preference selections. At step 210, the video chat management server 102 may modify, using image/video processing, at least one video stream as well as designate a current speaker. For instance, the video chat management server 102 may modify the video stream received from client device 108a in accordance with the user preference selections of users 110a and 110b. Similarly, the video chat management server 102 may modify the video stream received from client device 108b in accordance with the user preference selections of user 110c. The video chat management server 102 may modify the video stream received from client device 108c in accordance with the user preference selections of user 110d.

Figure 3C:
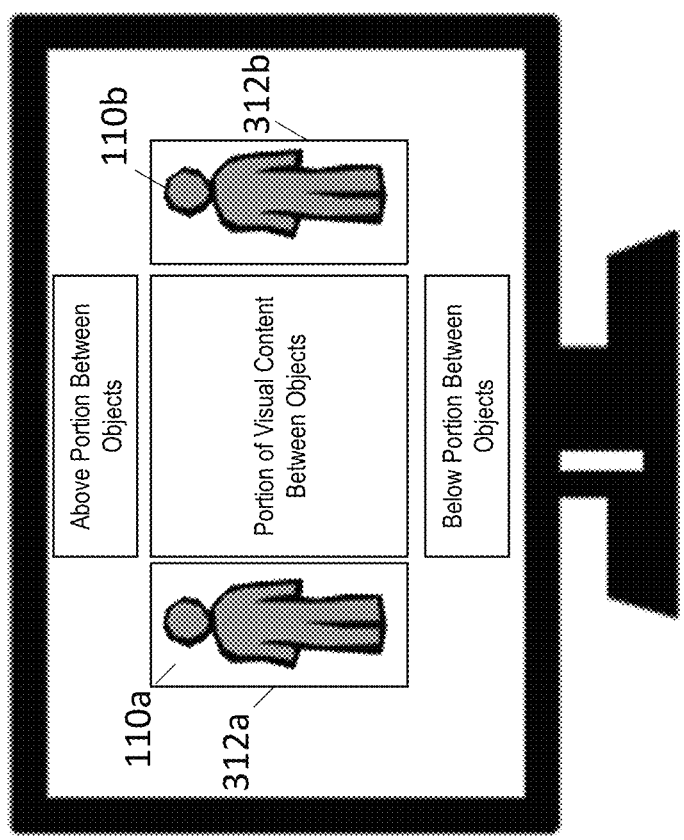
Figure 3D:
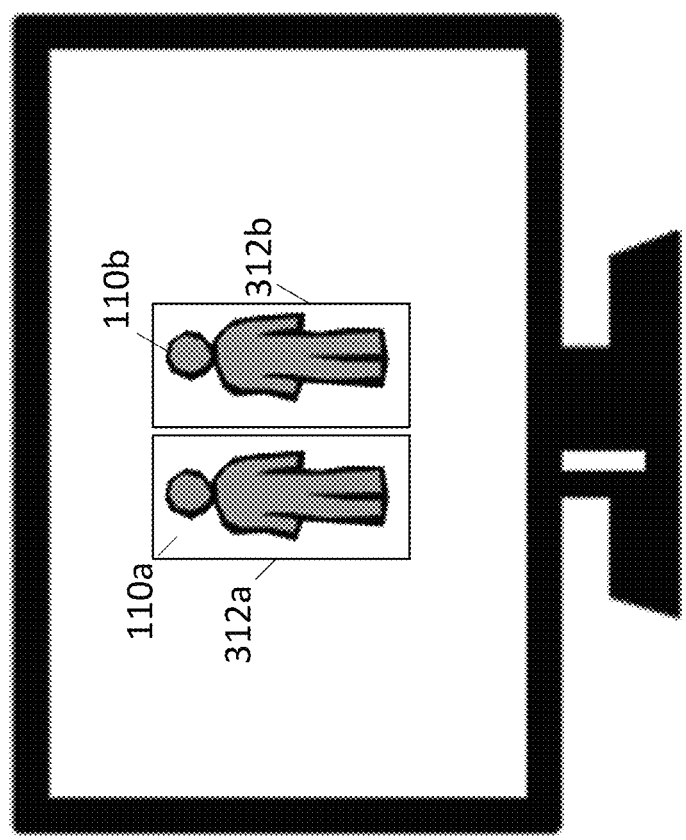
Figure 3E:
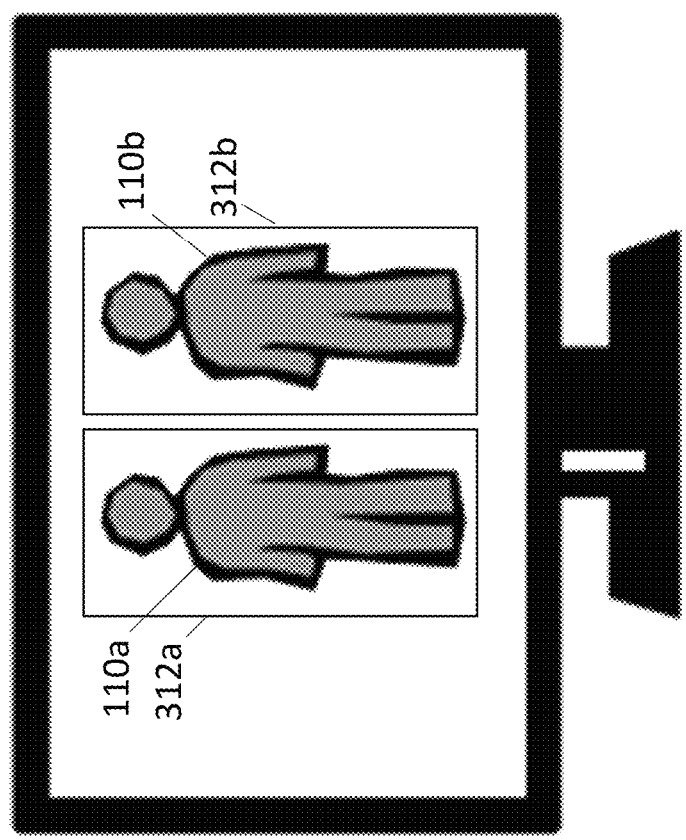

In one example, the video chat management server 102 may modify the video stream received from the client device 108a by performing one or more of the following steps. The video chat management server 102 may, as shown in display screen 315 of FIG. 3C, determine, in a frame of the video stream, a first object 312a representing the first user 110a and a second object 312b representing the second user 110b based on the preference selections (e.g., object selection (location of bounded boxes in frame such as x-y pixel locations)). The video chat management server 102 may also, based on the locations of the first and second objects 312, determine, for the frame, a portion of depicted visual content located between the objects 312 as shown FIG. 3C. The video chat management server 102 may also determine, based on the portion located between the objects 312, portions above and below the portion located between the objects 312 as shown in FIG. 3C. The video chat management server 102 may alter image data to remove the portion located between the objects 312 as well as the portions above and below it. The video chat management server 102 may place the remaining portions of the frame of the video stream such that the objects 312 are depicted adjacent to one another as shown in display screen 320 of FIG. 3D. The objects 312 may then be resized (e.g., enlarged, reduced) based on the user zoom preferences as shown in display screen 325 of FIG. 3E. Lastly, the frame may be cropped according to the user crop preferences. For example, perhaps the user 110a only wishes to be seen from the waist up and sets the crop parameters accordingly. Then, the video chat management server 102 may remove that portion of the frame that has been cropped out by the user. In some instances, only the objects 312 may remain as all other portions may be cropped by the user. In some instances, a user may be cropped/removed from the video stream. These modifications are performed on each received frame of the video stream received from computing device 110a to generate a modified video stream. In the modified stream, space between the users 110s and 110b due to social distancing has been removed and, as a result, the users 110a and 110b appear much larger than in the original video stream. In some instances, a video stream might not be modified if no preferences are selected.

The video chat management server 102 may determine which user is currently speaking based on the audio streams received from the client devices 108 and may designate the user as the current speaker. For instance, each audio streams may be specific to a particular microphone. Thus, in some cases, the video chat management server 102 may determine which audio stream has a voice input having a volume more than a preset threshold volume, identify the microphone corresponding to the determined audio stream, and identify the user 110 corresponding to that microphone to designate as the current speaker. Additionally or alternatively, the voice chat management server 102 may use voice recognition to identify the user and then designate that user as the speaker. Additionally or alternatively, the voice chat management server 102 may use lip tracking software to analyze the objects in the video streams to determine which user is moving his or her lips more than a predetermined threshold and identify that user as the speaker.

The video chat management server 102 may determine whether to divide (e.g., split) the modified video stream into multiple video streams based on the designated speaker. Once the speaker is designated, the video chat management server 102 may determine whether there are other users (e.g., objects) depicted in the same modified video stream as that of the user currently speaking. If not, the video stream including the user (e.g., object) that is currently speaking might not be divided. Otherwise, if there are other users (e.g., objects) in the same video stream as the user who is currently speaking, then the video chat management server 102 may split the video stream that includes the user/object currently speaking into multiple video streams. In order to split the video stream, the video chat management server 102 may determine the object associated with the user that is speaking and separate it into its own video stream, which may be done an a frame-by-frame basis. As a result of the split, there would be two video streams created from the modified video stream. A first video stream that includes only the user/object that is currently speaking and a second video that includes all of the remaining users/objects that were in the same modified video stream as the user/object that is currently speaking. Additionally or alternatively, the video chat management server 102 may further divide the video stream by separating each object into its own video stream so that each user has their own corresponding video stream.

At step 212, the video chat management server 102 may provide video streams, audio streams, and the speaker designation to all of the client devices 108 for output in the video chat session. For instance, any stream that was not modified by the video chat management server 102 may be provided to each of the client devices 108. For instance, any modified video stream (but not split/divided) may be provided to each of the client devices 108. For instance, any video streams resulting from the dividing of a video stream may be provided to each of the client devices 108. Further, all received audio streams may be provided to each of the client devices 108. Additionally, the speaker designation (e.g., an identification of user that is currently speaking as well as an identification of the corresponding object and video stream) may be provided to each of the client devices 108.

At step 214, the client devices 108 may output received audio and video streams in accordance with the speaker designation. As an example, each of the client device 108 may output display screen 330 as shown in FIG. 3F. The display screen 330 may include multiple display video tiles 332. There may be a different video tile 332 for each received video stream. The display screen 330 may display identification information (e.g., user ID) corresponding to the video tiles 332 adjacent to the video tiles 332, respectively. The video tile displaying the video stream that corresponding to the user that is currently speaking may be enlarged relative to the other video tiles corresponding to the users that are not currently speaking. In this example, user 110*a* is currently speaking and, as a result, the video tile 332*a* displaying the video stream of user 110*a* (i.e., the video stream resulting from the split of the modified video stream in the above example) is enlarged relative to the other video tiles. Notably, video tile 332*b* displays the remaining users (e.g., user 110*b*) that were part of the same modified video stream as user 110*a*. In some instance, each of these remaining users may be placed in the same video tile or placed into different video tiles for each user, respectively. The video tiles may be displayed at the same time in accordance with time synchronization information (e.g., timestamps associated with each of the video streams). The video tiles do not display the bounded boxes in the video chat session.

The client devices 108 may display the video chat session (e.g., display screen 330) via an integrated or separate display device. For instance, client device 108*a* may cause television 116 to display the display screen 330. For instance, client device 108*b* may display the display screen 330*a* via its integrated display. Similarly, client device 108*c* may display the display screen 330 via its integrated display.

The client devices 108 may also output each (e.g., all) of the audio streams. In some instance, the audio streams may be merged by the client device 108 or the video chat management server 102 prior to being output. In some instances, all of the audio streams are played by a client device 108 at the same time in accordance with time synchronization information (e.g., timestamps associated with each of the audio streams). The client devices 108 may output the audio stream(s) via an integrated or separate speaker device. For instance, client device 108*a* may cause a stereo system connected to the television 116 to output the audio streams. For instance, client device 108*b* may output the audio streams via its integrated speaker. Similarly, client device 108*c* may output the audio streams via its integrated speaker.

If the video chat session has ended, the method may end. However, if the video chat session has not ended, the client devices 108 may, at step 216, return to step 206 such that steps 206-216 are repeated until the video chat session has ended. However, in some instances, at step 206, the user preference options might not be sent as they have were already received by the video chat management server 102 previously. Consequently, the video chat management server 102 continuously receive audio/video streams from the client devices 108, modify them based on selected preference options and speaker designation, and send the resulting streams to the client devices 108 for output in the video chat session.

Figure 3G:
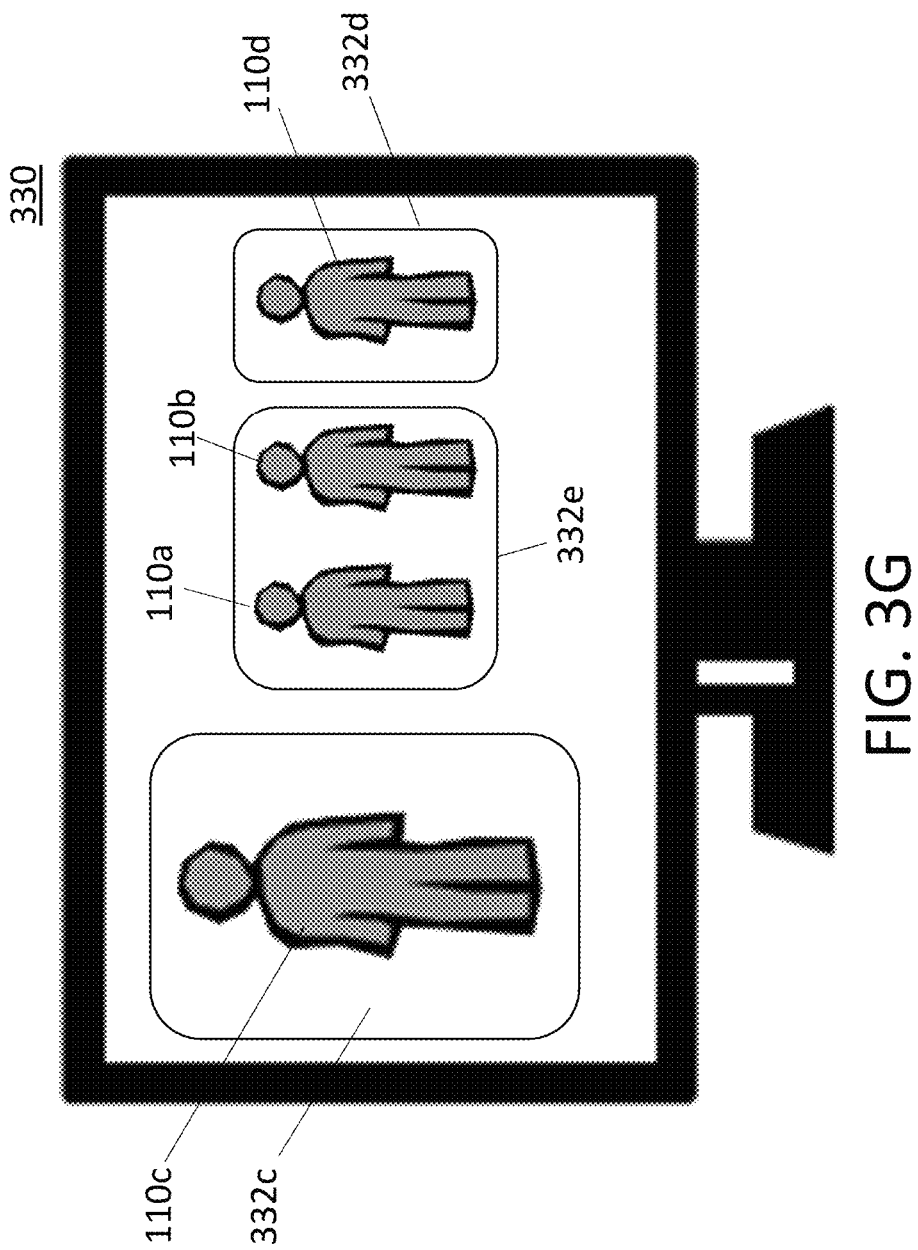

As the video chat session continues, different users may become the currently speaking user and, thus, the designated speaker. In such instances, the designated speaker's corresponding tiles may be enlarged relative to the other tiles and the former designated speaker's corresponding tile may be reduced to that of the tiles associated with non-speaking users. Further, the video chat management server 102 may merge divided video streams such that the users associated with the same client device 108 may be part of the same video stream as they were prior to the division and, thus, part of the same tile. Following the above example, once user 110*a* finishes speaking and user 110*c* begins speaking, the video chat management server 102 may merge divided video streams so that users 110*a* and 110*b* that correspond to client device 108*a* are part of the same video stream. As a result, when the client devices 108 eventually display the updated video chat session, a display screen such as display screen 330 of FIG. 3G may be displayed by the client devices 108. As shown, users 110*a* and 110*b* are part of the same video stream tile 332*e*. In some instances, there might not be a merge of the divided video streams, and users 110 and 110*b* may each have their own tile.

While the client device 108*b* is depicted as a tablet, in one or more instances, client device 108*b* may be another set-top box. Further, while only one user 110*c* is shown as corresponding with client device 108*b*, additional users may be associated with client device 108*b*. In such an instance, the video stream captured by client device 108*b* may be processed in a similar manner as described above in connection with the video stream captured by client device 108*a*.

While objects were selected by the users, in some cases, the objects may be automatically determined and tracked by the video chat management server 102 using object tracking.

In one or more arrangements, one or more functions described as being performed by the video chat management server 102 may be performed by one or more of the client devices 108.

Figure 4A:
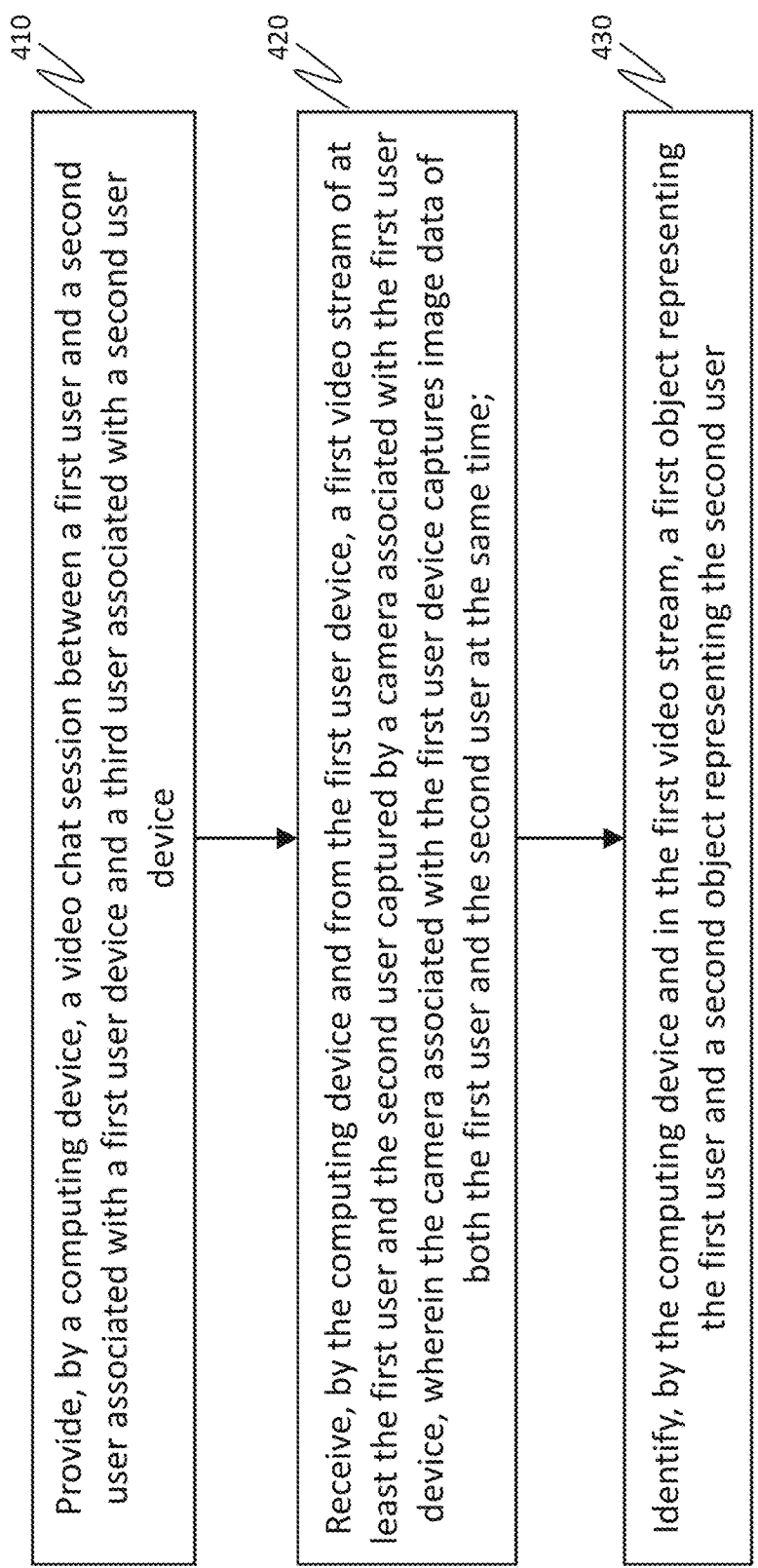
FIGS. 4A-4B depict an illustrative method for improving the video chat experience in accordance with illustrative embodiments of the present disclosure.
Figure 4B:
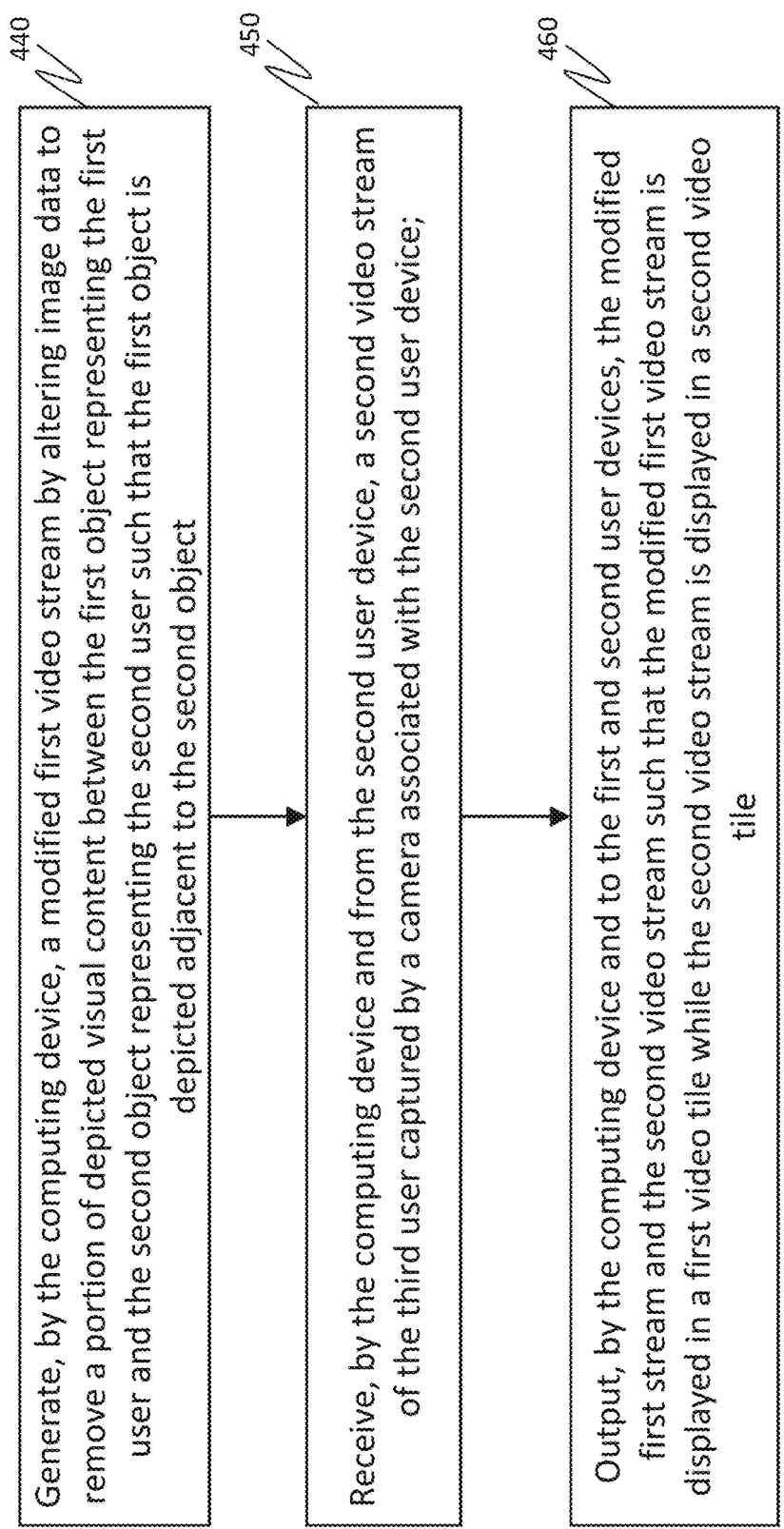

FIGS. 4A-4B depict an illustrative method 400 for improving the video chat experience in accordance with illustrative embodiments of the present disclosure. At step 410, a computing device (e.g., video chat management server 102) provides a video chat session between a first user and a second user associated with a first user device and a third user associated with a second user device. At step 420, the computing device receives, from the first user device, a first video stream of at least the first user and the second user captured by a camera associated with the first user device. The camera associated with the first user device captures image data of both the first user and the second user at the same time. At step 430, the computing device identifies, in the first video stream, a first object representing the first user and a second object representing the second user. At step 440, the computing device generates a modified first video stream by altering image data to remove a portion of depicted visual content between the first object representing the first user and the second object representing the second user such that the first object is depicted adjacent to the second object. At step 450, the computing device receives, from the second user device, a second video stream of the third user captured by a camera associated with the second user device. At step 460, the computing device outputs, to the first and second user devices, the modified first video stream and the second video stream such that the modified first video stream is displayed in a first video tile while the second video stream is displayed in a second video tile.

In some instances, the first user device is a set-top box connected to a television and wherein the outputting (step 460) to the set-top box causes the set-top box to display the first and second video tiles on the television. In some instances, the second user device is one of a smartphone, tablet, or computer.

In some instances, the determining the first and second objects (step 430) includes receiving, by the computing device and from the first user device, an indication marking a perimeter of the first object and an indication marking a perimeter of the second object. In some instances, the determining the first and second objects (step 430) includes receiving, by the computing device, from the first user device, and for each of the first user and the second user, selections for cropping the first video stream, zoom selections for the first and second objects, or selections to remove a fourth user depicted in the first video stream from the first video stream when generating the modified first video stream.

In some instances, portions of the depicted visual content above and below the first and second objects is maintained in the modified first video stream and the generating the modified first video stream (step 440) includes altering image data to remove portions above and below the removed portion of the depicted visual content between the first and second objects.

In some instances, the computing device determines which of the first user, the second user, and the third user is currently speaking in the video chat and designates the determined user as a speaker in the video chat by causing a video tile associated with the speaker to be enlarged. In some instances, the computing device, in response to designating the first user as the speaker, divides the modified first video stream into a first part including the first object and a second part including the second object and causes a video tile associated with the first part of the modified first video stream to be enlarged while causing a size of a video tile associated with the second part of the modified first video stream to be maintained. In some instances, the computing device, after the dividing and in response to designating the third user as the speaker, merges the first part of the modified first video stream with the second part of the modified first video stream.

In some instances, the determining of which of the first user, the second user, and the third user is currently speaking in the video chat is based on: a determination of which microphone of a plurality of microphones is currently receiving a voice input; a determination of which of the first user, the second user, and the third user is currently moving their lips more than a predetermined threshold; or voice recognition of one of the first user, the second user, or the third user.

Figure 5:
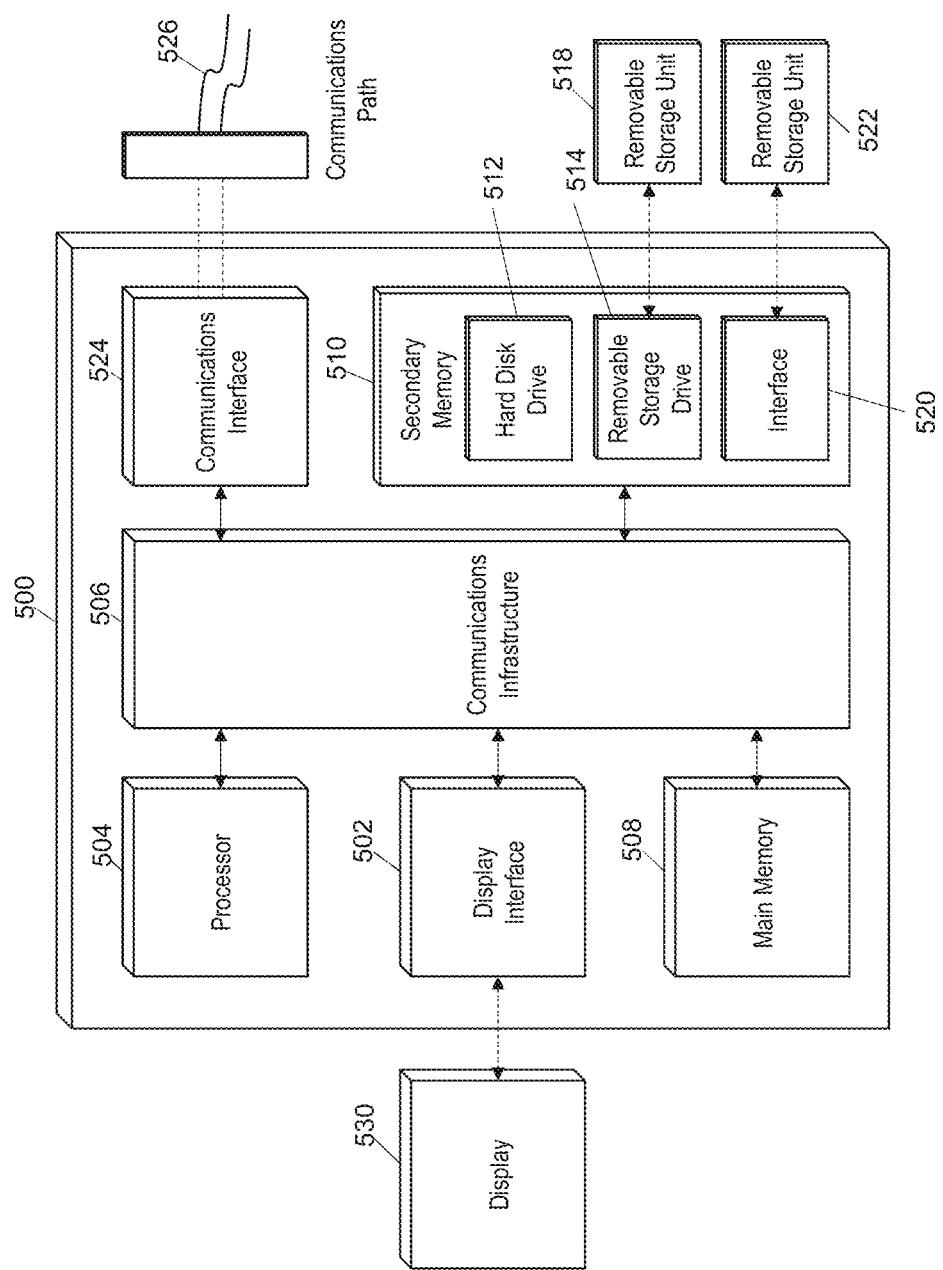
FIG. 5 depicts a block diagram of an illustrative hardware configuration operable to facilitate improvement of the video chat experience in accordance with illustrative embodiments of the present disclosure.

FIG. 5 illustrates a representative computer system 500 in which embodiments of the present disclosure, or portions thereof, may be implemented as computer-readable code executed on hardware. For example, each of the devices depicted in FIG. 1 may be implemented in whole or in part by a computer system 500 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this representative computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 504 may be processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 2A, 2B, 4A, and 4B as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A method for improving video chat experience, comprising:
   providing, by a computing device, a video chat session between (i) a first user and a second user associated with a first user device and (ii) a third user associated with a second user device;
   receiving, by a computing device and from the first user device, a first video stream of at least the first user and the second user captured by a camera associated with the first user device, wherein the camera associated with the first user device captures image data of both the first user and the second user at the same time;
   identifying, by the computing device and in the first video stream, a first object representing the first user and a second object representing the second user;
   generating, by the computing device, a modified first video stream by altering image data to remove a portion of depicted visual content above and below the first object representing the first user, above and below the second object representing the second user, and between the first object and the second object such that the first object is depicted directly adjacent to the second object and is in closer proximity to the second object than prior to the altering of the of the image data;
   receiving, by the computing device and from the second user device, a second video stream of the third user captured by a camera associated with the second user device; and
   outputting, by the computing device and to the first and second user devices, the modified first video stream and the second video stream such that
   the modified first video stream is displayed in a first video tile in which (i) the portion of the depicted content removed above and below the first object and second object is not visible, and (ii) the portion of the depicted content removed between the first object and second object is not visible, and
   the second video stream is displayed in a second video tile.

2. The method of claim 1,
   wherein the first user device comprises a set-top box connected to a television, and
   wherein the outputting to the set-top box causes the set-top box to display the first and second video tiles on the television.

3. The method of claim 1, wherein the second user device comprises one of a smartphone, tablet, or computer.

4. The method of claim 1, wherein the identifying the first and second objects comprises:
   receiving, by the computing device and from the first user device, an indication marking a perimeter of the first object and an indication marking a perimeter of the second object.

5. The method of claim 4, further comprising:
   receiving, by the computing device, from the first user device, and for each of the first user and the second user, selections for cropping the first video stream, zoom selections for the first and second objects, or selections to remove a fourth user depicted in the first video stream from the first video stream when generating the modified first video stream.

6. The method of claim 1, further comprising:
   identifying, by the computing device, which of the first user, the second user, and the third user is currently speaking in the video chat session; and
   designating the identified user as a speaker in the video chat session by causing a video tile associated with the speaker to be enlarged.

7. The method of claim 6, further comprising:
   in response to designating the first user as the speaker, dividing the modified first video stream into a first part including the first object and a second part including the second object and causing a video tile associated with the first part of the modified first video stream to be enlarged while causing a video tile associated with the second part of the modified first video stream to be maintained or reduced.

8. The method of claim 7, further comprising:
   after the dividing and in response to designating the third user as the speaker, merging the first part of the modified first video stream with the second part of the modified first video stream.

9. The method of claim 6, wherein the identifying which of the first user, the second user, and the third user is currently speaking in the video chat session is based on one or more of:
   an identification of which microphone of a plurality of microphones is currently receiving a voice input;
   an identification of which of the first user, the second user, and the third user is currently moving their lips more than a predetermined threshold; or
   voice recognition of one of the first user, the second user, or the third user.

10. A computing device for improving video chat experience, comprising:
    a network interface configured to interface with a first user device and a second user device;
    a processor; and
    a memory configured to store instructions that, when executed by the processor, cause the computing device to:

provide a video chat session between a first user and a second user associated with the first user device and a third user associated with the second user device;

receive, from the first user device, a first video stream of at least the first user and the second user captured by a camera associated with the first user device, wherein the camera associated with the first user device captures image data of both the first user and the second user at the same time;

identify, in the first video stream, a first object representing the first user and a second object representing the second user;

generate a modified first video stream by altering image data to remove a portion of depicted visual content above and below the first object representing the first user, above and below the second object representing the second user, and between the first object and the second object such that the first object is depicted directly adjacent to the second object and is in closer proximity to the second object than prior to the altering of the of the image data;

receive, from the second user device, a second video stream of the third user captured by a camera associated with the second user device; and output, to the first and second user devices, the modified first video stream and the second video stream such that the modified first video stream is displayed in a first video tile in which (i) the portion of the depicted content removed above and below the first object and second object is not visible, and (ii) the portion of the depicted content removed between the first object and second object is not visible, and the second video stream is displayed in a second video tile.

11. The computing device of claim 10,
wherein the first user device comprises a set-top box connected to a television, and
wherein the instructions that, when executed, cause the computing device to output the first and second video tiles causes the set-top box to display the first and second video tiles on the television.

12. The computing device of claim 10, wherein the second user device comprises one of a smartphone, tablet, or computer.

13. The computing device of claim 10, wherein the instructions that, when executed, cause the computing device to identify the first and second objects by:

receiving, from the first user device, an indication marking a perimeter of the first object and an indication marking a perimeter of the second object.

14. The computing device of claim 13, wherein the instructions, when executed, further cause the computing device to:
receive, from the first user device, and for each of the first user and the second user, selections for cropping the first video stream, zoom selections for the first and second objects, or selections to remove a fourth user depicted in the first video stream from the first video stream when generating the modified first video stream.

15. The computing device of claim 10, wherein the instructions, when executed, further cause the computing device to:
identify which of the first user, the second user, and the third user is currently speaking in the video chat session; and
designate the identified user as a speaker in the video chat session by causing the video tile associated with the speaker to be enlarged.

16. The computing device of claim 15, wherein the instructions, when executed, further cause the computing device to:
in response to designating the first user as the speaker, divide the modified first video stream into a first part including the first object and a second part including the second object and causing a video tile associated with the first part of the modified first video stream to be enlarged while causing a video tile associated with the second part of the modified first video stream to be maintained or reduced.

17. The computing device of claim 16, wherein the instructions, when executed, further cause the computing device to:
after the dividing and in response to designating the third user as the speaker, merge the first part of the modified first video stream with the second part of the modified first video stream.

18. The computing device of claim 15, wherein the determination of which of the first user, the second user, and the third user is currently speaking in the video chat session is based on one or more of:
an identification of which microphone of a plurality of microphones is currently receiving a voice input;
an identification of which of the first user, the second user, and the third user is currently moving their lips more than a predetermined threshold; or
voice recognition of one of the first user, the second user, or the third user.

* * * * *